Figure 1:
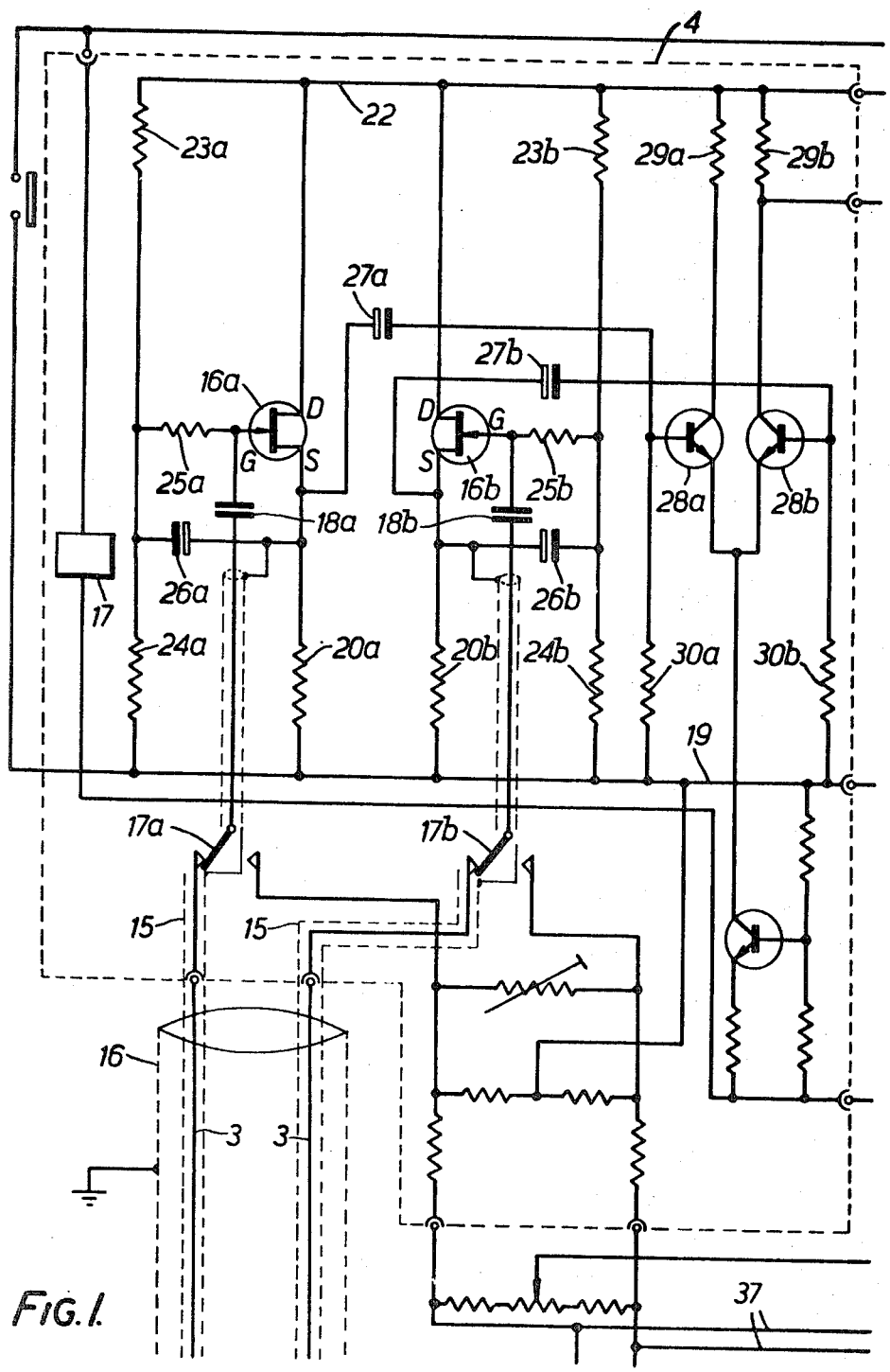
Figure 2:
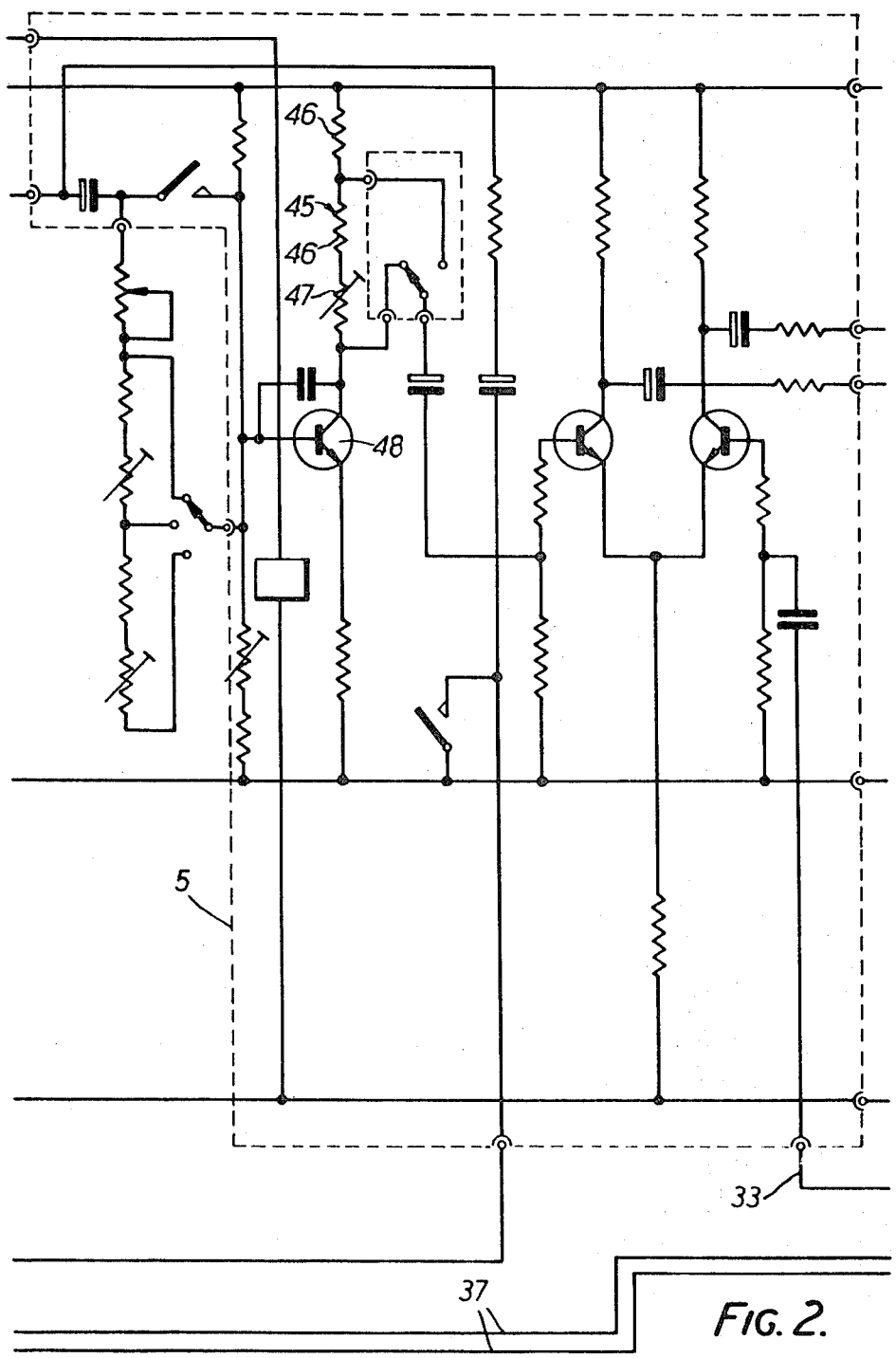
Figure 3:
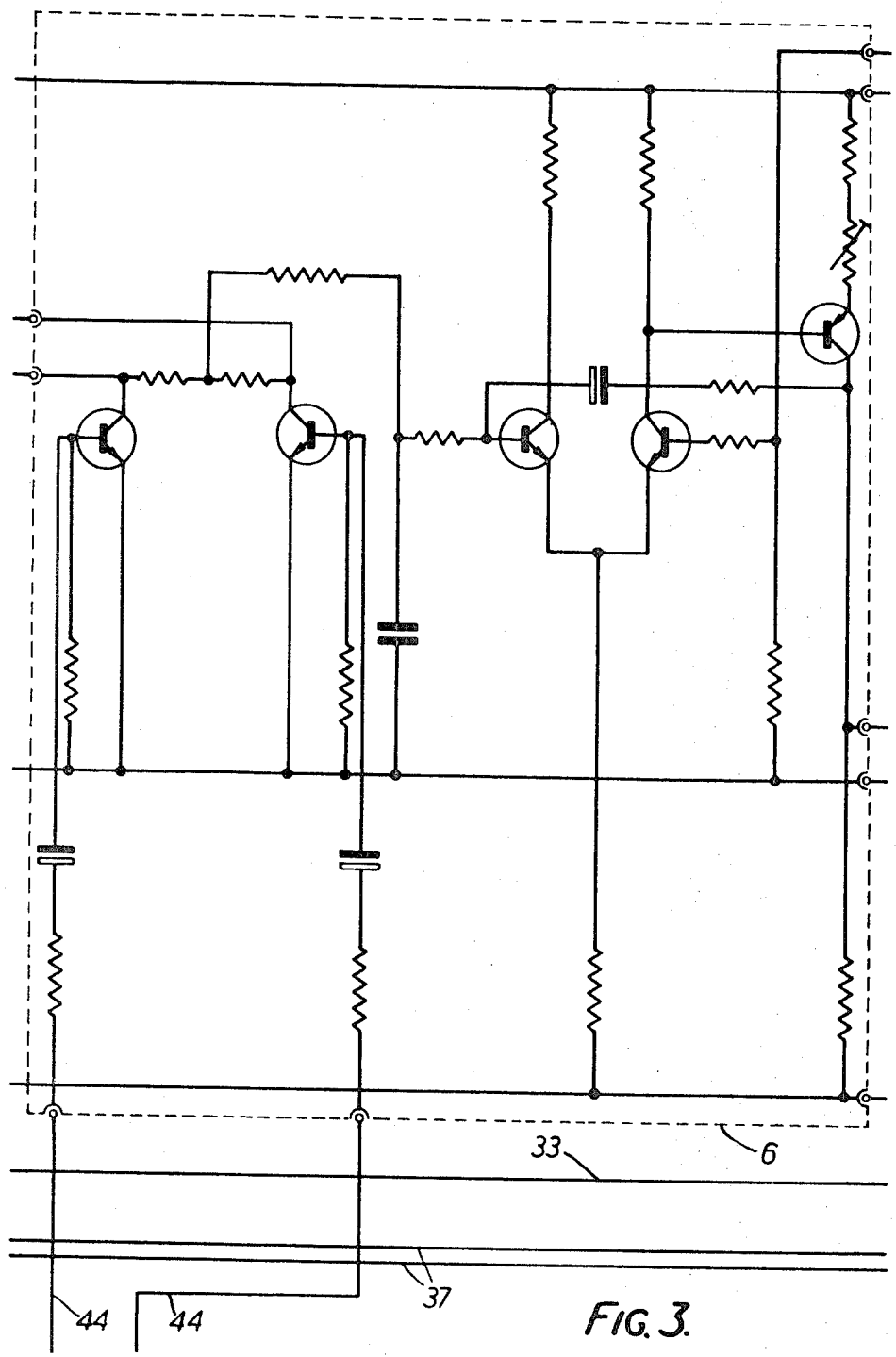
Figure 4:
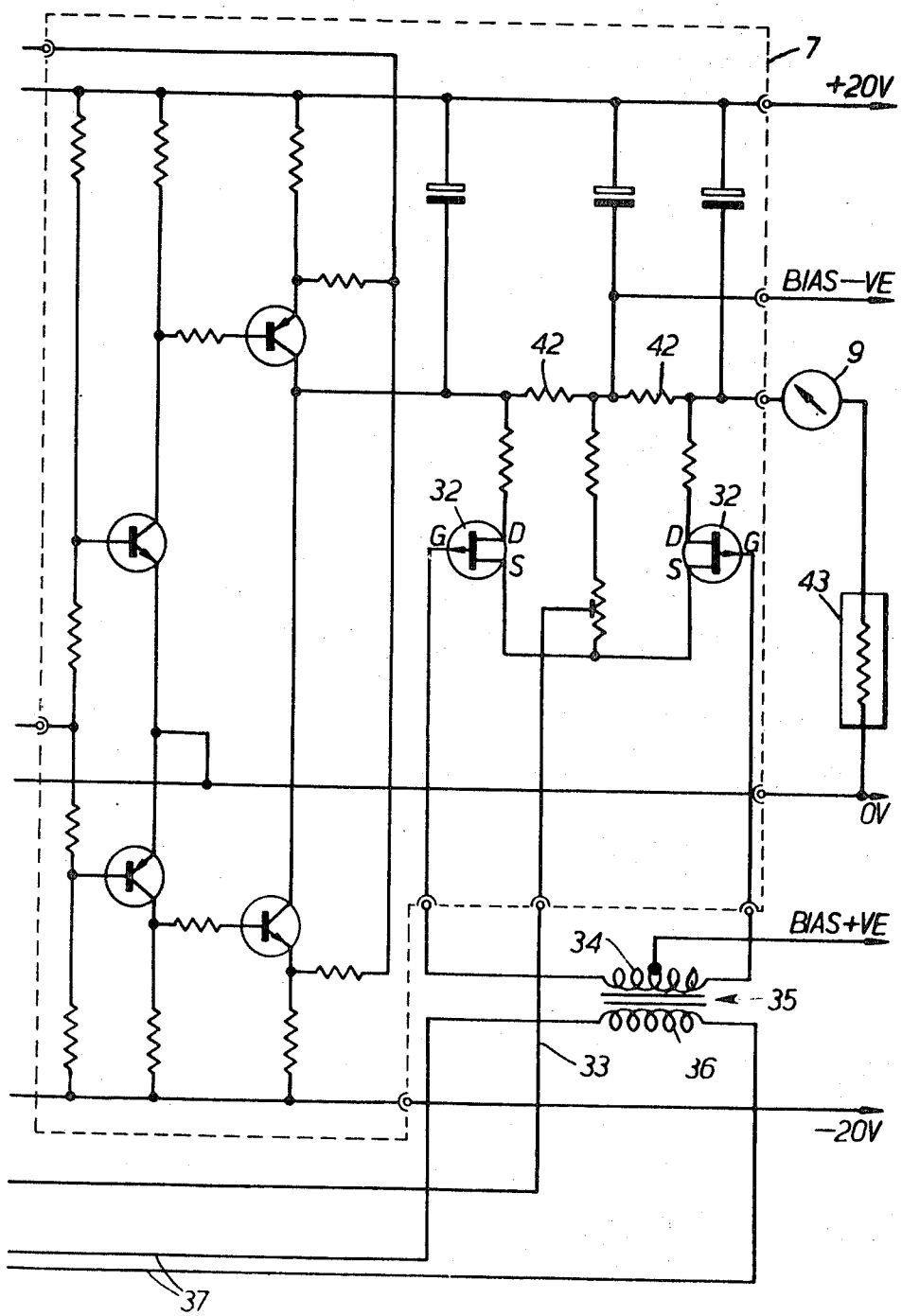

United States Patent

[11] 3,603,146

| [72] | Inventors | Leonard Myer Bennett<br>Rodborough, Stroud;<br>John Edwin Cripps, Horsley, Stroud, both of, England |
|---|---|---|
| [21] | Appl. No. | 834,270 |
| [22] | Filed | June 18, 1969 |
| [45] | Patented | Sept. 7, 1971 |
| [73] | Assignee | Schutte and Koerting Company<br>Cornwells Heights, Pa. |

[54] ELECTROMAGNETIC FLOWMETERS
2 Claims, 7 Drawing Figs.

[52] U.S. Cl. ................................................ 73/194 EM, 73/3
[51] Int. Cl. ................................................ G01f 1/00
[50] Field of Search ........................................ 73/194, 3

[56]       References Cited
UNITED STATES PATENTS

| 3,078,712 | 2/1963 | Koblenz et al. | 73/194 |
| 3,131,560 | 5/1964 | Cushman et al. | 73/194 |
| 3,260,109 | 7/1966 | Schmoock | 73/194 |
| 3,263,500 | 8/1966 | Krishnaswamy | 73/194 |
| 3,339,410 | 9/1967 | Steru | 73/194 |
| 3,380,301 | 4/1968 | Mannhertz | 73/194 |
| 3,385,107 | 5/1968 | Hutcheon et al. | 73/194 |

Primary Examiner—Richard C. Queisser
Assistant Examiner—John Whalen
Attorney—Howson and Howson ABSTRACT: An electromagnetic flowmeter comprising a detector head, an amplifier and a calibration circuit unit the characteristics of which are related to the sensitivity of the head in such manner that when the unit is connected to the amplifier in the appropriate way it operates to match the amplifier gain to the head sensitivity.

INVENTORS:
LEONARD MYER BENNETT
JOHN EDWIN CRIPPS

Howdon & Howdon
ATTORNEYS

ELECTROMAGNETIC FLOWMETERS

This invention relates to flowmeters of the electromagnetic type, comprising a detector head which is connected through electrode leads to a measuring amplifier. The head incorporates an energizing coil or coils to produce a magnetic field across the liquid flow through the head to be measured, and electrodes which detect the e.m.f. generated across the liquid as a result of the liquid flowing across the magnetic field. The amplifier output can be utilized in any desired manner, for example to operate a flow indicator and/or recorder and/or controller.

In existing electromagnetic flowmeters the sensitivity of the individual detector heads varies considerably, even in apparently identical instruments. Thus on setting up it is necessary to calibrate the complete instrument by adjusting the amplifier to gain to suit the particular head used, and recalibration is necessary if either the head or the amplifier is changed for any reason. This is a serious disadvantage, for example if a faulty amplifier measuring a critical flow in an important process has to be replaced at an inconvenient time. The object of the invention is to provide an instrument in which either the head or the amplifier can be replaced with greater facility than hitherto while retaining the instrument accuracy unimpaired.

According to the invention an electromagnetic flowmeter comprises a detector head, an amplifier and a calibration circuit unit the characteristics of which are related to the sensitivity of the head in such manner that when the unit is connected to the amplifier in the appropriate way it operates to match the amplifier gain to the head sensitivity.

Preferably the calibration circuit unit is in the form of a plug-in module which plugs into the flowmeter circuit to modify the characteristics thereof to suit the flowmeter head to which the module relates, and for convenience such a module is hereinafter referred to as a "characterizing plug" although it will be appreciated that any form of circuit unit can be used which is connectable to the amplifier in the appropriate manner. The invention enables a manufacturer to supply electromagnetic flowmeters as a whole which are precalibrated, and at the same time or later to supply replacement amplifiers of standard nominal gain and separate replacement heads each accompanied by an appropriate characterizing plug. Thus the amplifier of the original instrument can be replaced when necessary without any need for calibration provided the original characterizing plug is still used, and if the head is replaced the original amplifier can be retained without recalibration provided the appropriate new characterizing plug is used.

Figure 7:
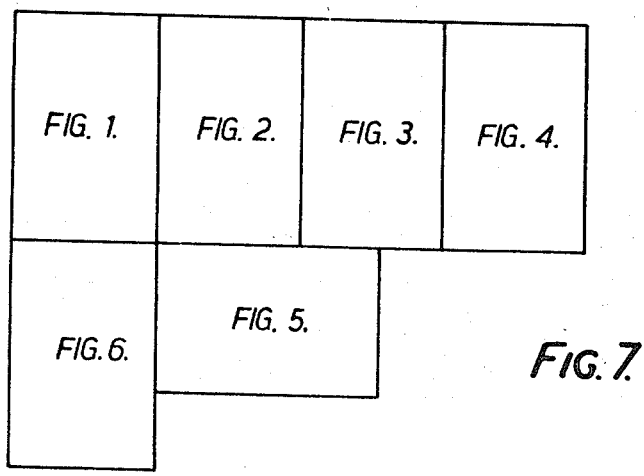

The energizing coils of detector heads are normally supplied with current derived from the mains electricity supply, and it is necessary to compensate for mains voltage fluctuations as for a given flow rate the electrode voltage is dependent on the strength of the magnetic field and hence on the energizing current. Such compensation is normally achieved by means of a reference signal obtained from the secondary of a current transformer the primary of which is connected in series with the energizing coils. In preferred embodiments of the invention the characterizing plug takes the form of a preset variable resistor which, when connected in said appropriate way, operates to shunt the current transformer secondary and hence modify the reference signal which is still operative to control the amplifier gain in accordance with the energizing current but at a different level dependent upon the detector head sensitivity. The invention will now be further described with reference to the accompanying circuit diagram which shows, by way of example, an electromagnetic flowmeter amplifier embodying the invention, together with a detector head of the flowmeter. In the drawings:

FIGS. 1 to 6 are portions of the electrical circuit diagram of the amplifier and detector head, and FIG. 7 is a key illustrating the manner in which FIGS. 1 to 6 combine together to represent the complete circuit diagram.

Figure 5:
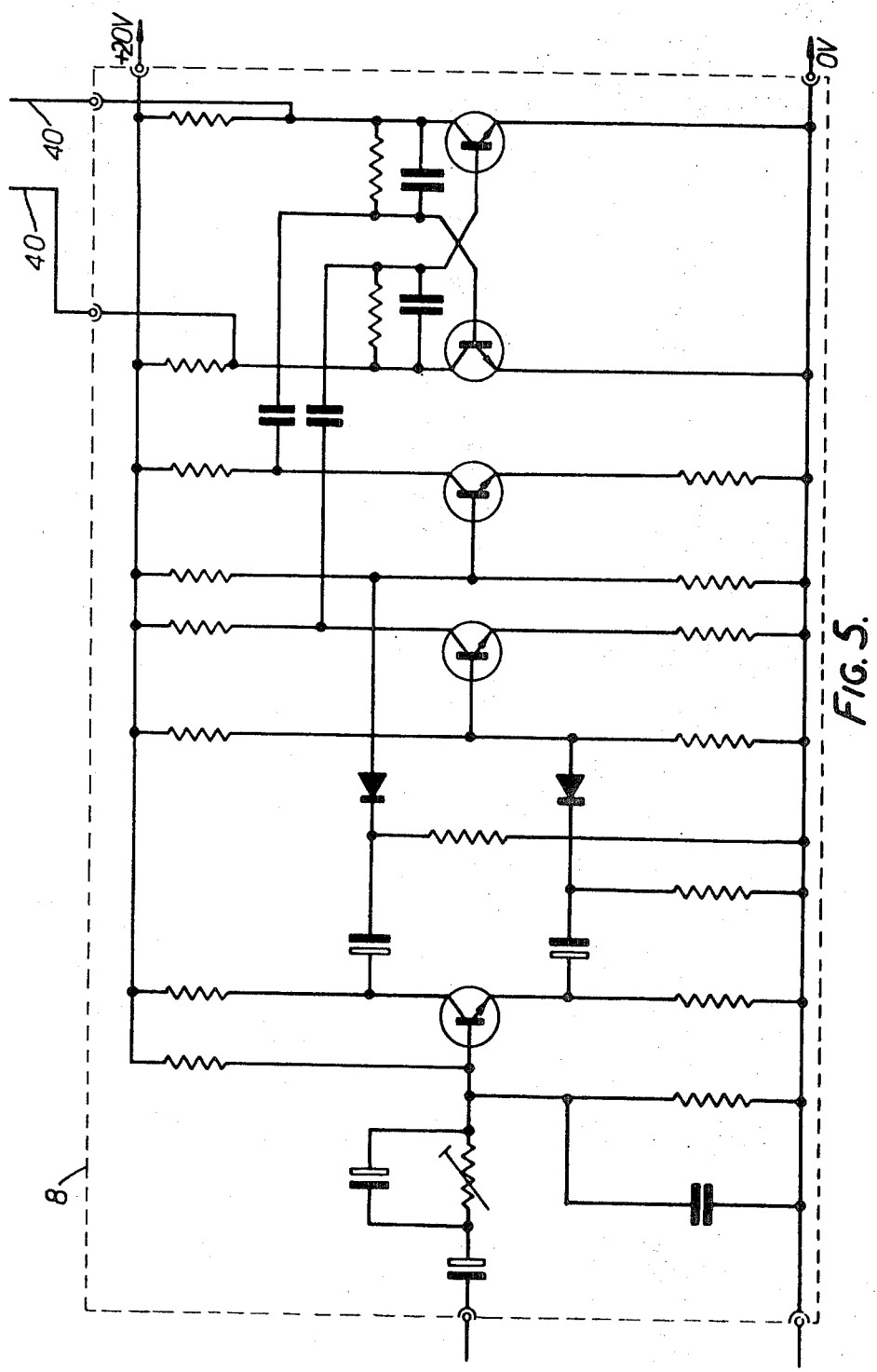
Figure 6:
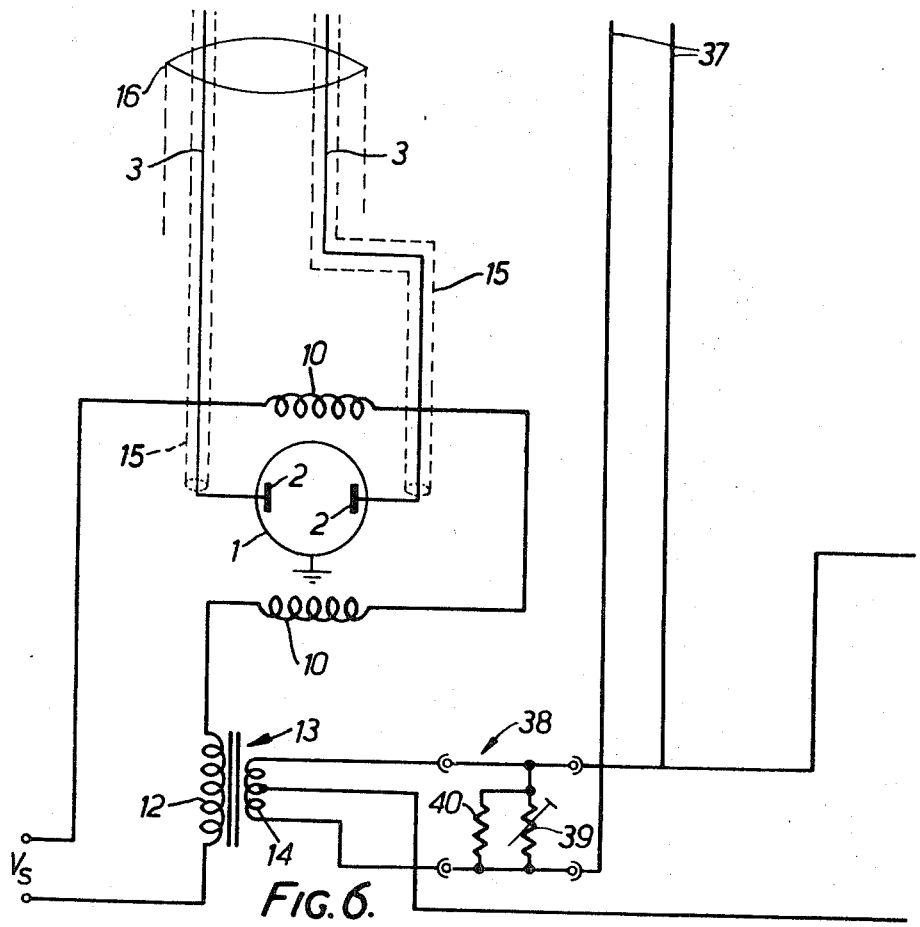

The detector head has a flow tube 1 (FIG. 6) carrying a pair of diametrically opposed electrodes 2 connected through electrode leads 3 to the amplifier which comprises the following units indicated in broken lines in the drawings: an input unit 4 (FIG. 1), an AC amplifier unit 5 (FIG. 2), a demodulator unit 6 (FIG. 3) an output unit 7 (FIG. 4) and a squarer unit 8 (FIG. 5). The output unit 7 provides a DC output signal the current magnitude of which is dependent on the flow rate and the polarity of which is dependent on the flow direction. This output signal is fed to an indicating meter 9 (FIG. 4) which may be calibrated directly in terms of volumetric flow. The head has a pair of field windings 10 (FIG. 6) which are energized from an AC mains supply $V_s$ and connected in series with the primary winding 12 of a current transformer 13, the current in the secondary winding 14 of which is thus proportional to the energizing current and hence to the magnetizing field.

The amplifier is designed to provide a high input impedance with a low degree of capacitive shunting of the leads 3 from the flowmeter electrodes 2 which provide a signal differentially balanced with respect to earth, and to this end the electrode leads 3 are individually screened to provide guard shields 15 which are connected to the respective source terminals 5 of the transistors 16a and 16b. Normally, the two leads 3, with their respective driven guard shields 15, would be surrounded by an overall earthed screen such as that indicated at 16 in FIGS. 1 and 6.

The input unit 4 comprises two identical input stages corresponding circuit components of which are respectively identified by the suffixes a and b. The stages comprise two n-channel field effect transistors 16a and 16b, the drain gate and source terminals of which are respectively designated D, G, and S in FIG. 1. The electrode leads 3 are respectively connected to the two input stages by ganged contacts 17a and 17b of a relay 17. As the two input stages are identical, the following description refers to the stage comprising the transistor 16a, exactly similar considerations applying to the other input stages are identical, the following description refers to the stage comprising the transistor 16a, exactly similar considerations applying to the other input stage comprising the transistor 16b.

The contact 17a is connected through a capacitor 18a directly to the gate terminal G of the field effect transistor 16a which operates as a source follower. The source terminal S of the transistor 16a is connected to earth (the zero voltage line 19) through a resistor 20a and the drain terminal D is connected directly to a positive supply line 22. The bias potential for the transistor 16a is obtained from a bias circuit including boot-strapped bias resistors, two resistors 23a and 24a connected in series across the supply lines 19 and 22 providing a potential divider the intermediate point of which is connected through a resistor 25a to the gate terminal G of the field effect transistor 16a. A blocking capacitor is connected between the source terminals of the transistor 16a and the intermediate point of the potential divider. The source terminal S provides the circuit output, and with a source follower circuit of this nature the overall gain should, for a maximum input impedance, approach closely to unity.

Each input stage is connected in circuit with a corresponding normal transistor as will now be described. The output from the transistor 16a is fed, through a blocking capacitor 27a, to the base terminal of the associated normal transistor 28a, it being understood that the field effect transistor 16b supplies a similar normal transistor 28b through a blocking capacity 27b. The emitters of the two transistors 28a and 28b are interconnected and the collectors of these transistors 28a and 28b are interconnected and the collectors of these transistors are respectively connected to the positive supply line 22 through resistors 29a and 29b, with the bases of the transistors being connected to the zero voltage line 19 through resistors 30a and 30b. The transistors 28a and 28b form a differential amplifier the primary function of which is to eliminate any common mode input signal, and to provide a single-ended output proportional to the differential output.

The output unit 7 (FIG. 4) includes a multiplier circuit having two p- channel field effect transistors 32 the source terminals S of which are interconnected and provide, through a feedback loop 33, a feedback signal which is fed into the AC amplifier unit 5 so as to stabilize the completed amplifier and, in particular, to render the latter independent of variation in gain due to transistor spreads and temperature effects. The gate terminals G of the transistors 32 are interconnected through a secondary winding 34 of a center-tapped voltage transformer 35, the primary winding 36 of which is connected directly, through leads 37, to the secondary winding 14 of the current transformer 13. A characterizing plug 38 takes the form of a separate plug-in module and comprises a variable but preset resistor 39 in parallel with a nonvariable resistor 40.

It will be appreciated from the preceding description of the various circuit functions that the complete amplifier can be calibrated to give a standard nominal gain, with a standard resistance in place of the characterizing plug 38, while the actual gain in use is dependent upon the reference signal from the transformer 13 as modified by the characterizing plug 38 to suit the sensitivity of the particular detector head used. Thus the characterizing plug 38 is preset to provide full-scale output from the amplifier for a given flow rate, and provided that all amplifiers have been set to the same nominal gain any detector head of the same type can be used with any amplifier of the same type provided the appropriate characterizing plug is also used. In particular, no calibration on site is required.

The transistors 32 are thus transformer coupled and provide an output signal into the feedback loop 33 which is proportional to the product of the AC energizing current in the field windings 10 (as modified by the characterizing plug 38) and the DC output current flowing through two series resistors 42 connected in series with the meter 9. As shown in the drawing, the meter may be connected to the zero voltage line 19 through a resistive load 43. The squarer unit 8 is supplied with a control signal from the secondary winding 14 of the current transformer 13 and operates to produce accurately phased square waves which are fed into the demodulator unit 6 through leads 44, the square waves acting to switch the demodulator unit 6 in a manner known per se.

In one modification of the construction shown in the drawings the characterizing plug 38 instead of being associated with the current transformer 13 and modifying the reference signal, is connected into the circuit of the amplifier unit 5 and operates to modify the output thereof. To this end a network 45, which comprises two resistors 46 and a preset potentiometer 47 connected in series in the collector circuit of a transistor 48 of the unit 5, is replaced by a fixed resistor in series with a potentiometer forming the characterizing plug. The wiper arm of the potentiometer provides the differential amplifier output and thus the effective gain of the amplifier as a whole depends on the setting of the potentiometer which is preset to match the sensitivity of the corresponding detector head.

We Claim:
1. An electromagnetic flowmeter comprising:
    a detector head for sensing, and for producing signals representative of, flow rate of a medium;
    an amplifier supplied with said flow rate representative signals for amplifying them; and
    an indicator supplied with said amplified signals from said amplifier for producing indications of said flow rate;
    said indicator being calibrated to provide indications of flow rate as a function of the magnitude of a calibrating input signal thereto;
    said amplifier being calibrated to produce a predetermined output signal for a given input signal thereto; and
    a gain-modifying element operatively connected in said amplifier and removable from and insertable into said amplifier as a unit, said gain-modifying element being settable to different conditions as to produce corresponding different values of amplification by said amplifier;
    said gain-modifying element being identified as associated with said head and preset in accordance with the electrical characteristics of said head, prior to insertion into said amplifier, to modify the amplification of said amplifier so that the output signal from said amplifier applied to said indicator is of the magnitude to produce indications properly indicative of said rate of flow, whereby said amplifier, said indicator, or the combination of said head and said gain-modifying element may be replaced without requiring recalibrating of the flow meter;
    said head including a circuit for providing supply current to operate said head, and transformer means having a primary connected to sense the magnitude of said supply current, whereby a voltage having a magnitude representative of said current magnitude is produced across the secondary of said transformer; in which said voltage is applied to said amplifier to control its amplification as a function of the magnitude of said supply current; and wherein said gain-modifying element comprises resistive means connected in parallel with said transformer secondary when said element is inserted into said amplifier. p
2. The method of providing calibrated flowmeters and of replacing parts thereof without requiring recalibration of the flowmeter, wherein said flowmeter is of the type comprising a detector head for sensing, and for producing signals representative of, the rate of flow of a medium past said head, an amplifier supplied with said signals for producing an amplified output signal in response thereto, and an indicator supplied with said output signals to produce indications of said rate of flow, said method comprising the steps of:
    fabricating a plurality of standard amplifiers all having substantially the same nominal amplification characteristics, and each adapted to have connected therein a gain-modifying element which, when so connected, modifies the gain of the amplifier in a manner determined by the characteristics of said element so as to produce an output signal of predetermined value in response to an input signal of predetermined value applied to said amplifier;
    calibrating a plurality of indicators similarly, in response to the same test input signal, to provide rate-of-flow indications thereon as a function of said test input signal;
    fabricating a plurality of detector heads having similar but differing characteristics;
    fabricating a plurality of separately settable gain-modifying elements each adapted to be removably connected to any of said plurality of amplifiers to modify the amplification thereof according to the setting of the particular gain-modifying element so connected;
    setting each one of said gain-modifying elements so that, when a particular corresponding one of said detector heads is connected through one of said standard amplifiers to one of said calibrated indicators, and when said one gain-producing element is operatively connected to said one amplifier, said one indicator indicates properly the rate of flow of a medium past said detector head;
    providing identification associating each of said gain-modifying elements with the corresponding detector head with reference to which it was set;
    assembling one of said amplifiers, one of said indicators, and one of said gain-modifying elements with the corresponding one of said detector heads, into an operative flowmeter; and
    replacing the gain-modifying element and detector head in said assembled flowmeter with another of said plurality of gain-modifying elements and with the corresponding associated head.